United States Patent
Seth et al.

(10) Patent No.: US 9,206,317 B2
(45) Date of Patent: Dec. 8, 2015

(54) FLUOROSILICONE BLEND RELEASE MATERIALS

(75) Inventors: Jayshree Seth, Woodbury, MN (US); Marie A. Boulos, West St. Paul, MN (US); Zai-Ming Qiu, Woodbury, MN (US); Janet A. Venne, Roseville, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 226 days.

(21) Appl. No.: 13/504,545

(22) PCT Filed: Dec. 14, 2009

(86) PCT No.: PCT/US2009/067839
§ 371 (c)(1),
(2), (4) Date: Apr. 27, 2012

(87) PCT Pub. No.: WO2011/059462
PCT Pub. Date: May 19, 2011

(65) Prior Publication Data
US 2012/0219794 A1    Aug. 30, 2012

Related U.S. Application Data

(60) Provisional application No. 61/261,586, filed on Nov. 16, 2009.

(51) Int. Cl.
| | |
|---|---|
| C09J 7/02 | (2006.01) |
| C08L 83/08 | (2006.01) |
| C09D 183/08 | (2006.01) |
| C08K 5/01 | (2006.01) |
| C08K 5/05 | (2006.01) |
| C08K 5/06 | (2006.01) |
| C08K 5/07 | (2006.01) |
| C08G 77/24 | (2006.01) |
| C08K 5/54 | (2006.01) |
| C08G 77/12 | (2006.01) |
| C08G 77/20 | (2006.01) |

(52) U.S. Cl.
CPC ............ *C08L 83/08* (2013.01); *C09D 183/08* (2013.01); *C09J 7/0228* (2013.01); *C08G 77/12* (2013.01); *C08G 77/20* (2013.01); *C08G 77/24* (2013.01); *C08K 5/01* (2013.01); *C08K 5/05* (2013.01); *C08K 5/06* (2013.01); *C08K 5/07* (2013.01); *C08K 5/5406* (2013.01); *C09J 2483/005* (2013.01); *Y10T 428/2839* (2015.01)

(58) Field of Classification Search
None
See application file for complete search history.

(56) References Cited

U.S. PATENT DOCUMENTS

| | | | |
|---|---|---|---|
| 4,260,698 | A | 4/1981 | Tatemoto et al. |
| 4,450,263 | A | 5/1984 | West |
| 5,082,706 | A | 1/1992 | Tangney |
| 5,132,366 | A | 7/1992 | Kashida et al. |
| 5,447,987 | A * | 9/1995 | Sato et al. ............ 524/731 |
| 5,492,969 | A | 2/1996 | Hamada et al. |
| 5,496,784 | A * | 3/1996 | Byrd ............ 502/152 |
| 5,578,381 | A | 11/1996 | Hamada et al. |
| 6,730,397 | B2 | 5/2004 | Melancon et al. |
| 7,199,197 | B2 | 4/2007 | Caldwell et al. |
| 7,268,197 | B2 | 9/2007 | Moore et al. |
| 7,279,210 | B2 | 10/2007 | Hulteen et al. |
| 7,291,688 | B2 | 11/2007 | Qiu et al. |
| 7,345,123 | B2 | 3/2008 | Qiu et al. |
| 7,371,464 | B2 | 5/2008 | Sherman et al. |
| 2005/0038183 | A1 * | 2/2005 | Ahn et al. ............ 524/861 |
| 2005/0038217 | A1 | 2/2005 | Ahn |
| 2007/0069187 | A1 | 3/2007 | Tonge |
| 2007/0161749 | A1 | 7/2007 | Hartmann et al. |

FOREIGN PATENT DOCUMENTS

| | | |
|---|---|---|
| EP | 0 488 709 A2 | 6/1992 |
| EP | 0 545 659 | 6/1993 |
| EP | 0 656 391 | 6/1995 |
| EP | 0 671 434 | 9/1995 |
| EP | 850 999 * | 7/1998 |
| GB | 1 351 144 | 4/1974 |

OTHER PUBLICATIONS

"Silicones: An Introduction to Their Chemistry and Applications" authored by Freeman and published by Illife Books © 1962.*
PCT International Search Report, PCT/US2009/067839 mailed Jun. 2, 2010, 3 pages.
Heping, Li, "Principes and Technologies for Manufacturing Adhesives", Chemical Industry Press of China, Aug. 2009, pp. 414-415.

* cited by examiner

*Primary Examiner* — Marc Zimmer
(74) *Attorney, Agent, or Firm* — Dena M. Ehrich

(57) ABSTRACT

Release compositions comprising a blend of ethylenically unsaturated fluoroorganopolysiloxane polymers and ethylenically unsaturated non-fluorinated organopolysiloxane polymers are described. The release compositions are dispersed in a solvent system and also contain a catalyst and at least one crosslinker. Both fluoroorganohydrogenpolysiloxane and organohydrogenpolysiloxane are described. Release liners and adhesive articles including cured release compositions are also disclosed.

17 Claims, 1 Drawing Sheet

FLUOROSILICONE BLEND RELEASE MATERIALS

CROSS REFERENCE TO RELATED APPLICATIONS

This application is a national stage filing under 35 U.S.C. 371 of PCT/US2009/067839, filed Dec. 14, 2009, which claims priority to U.S. Provisional Application No. 61/261,586, filed Nov. 16, 2009, the disclosure of which is incorporated by reference in its/their entirety herein.

FIELD

The present disclosure relates to release materials, including release materials suitable for use with silicone adhesives. The release materials contain a blend of fluorosilicone release material and non-fluorinated organo silicone material.

SUMMARY

Briefly, in one aspect the present disclosure provides a coatable release solution. The coatable release solution comprises a curable release composition dissolved in a solvent system. The curable release composition comprises an ethylenically unsaturated fluoroorganopolysiloxane polymer; a non-fluorinated organopolysiloxane polymer comprising an average of at least two ethylenically unsaturated organic groups; a hydrosilation catalyst; and at least one crosslinker. The crosslinker is selected from the group consisting of a fluoroorganohydrogenpolysiloxane and an organohydrogenpolysiloxane. In some embodiments, the composition comprises both the fluoroorganohydrogenpolysiloxane and the organohydrogenpolysiloxane crosslinkers.

In some embodiments, the non-fluorinated organopolysiloxane polymer has a vinyl equivalent weight of no greater than 60,000 grams per equivalent. In some embodiments, the non-fluorinated organopolysiloxane polymer has a vinyl equivalent weight of 2000 to 5000 grams per equivalent. In some embodiments, the ethylenically unsaturated fluoroorganopolysiloxane polymer comprises an average of at least two ethylenically unsaturated organic groups.

In some embodiments, fluoroorganopolysiloxane polymer comprises a siloxane backbone and pendant C1 to C6 perfluoroalkyl groups bonded to backbone with a linking group. In some embodiments, the linking group is an alkylene group comprising at least two carbon atoms. In some embodiments, the alkylene linking group is $-C_2H_4-$. In some embodiments, the pendant perfluoroalkyl group is $-C_4F_9$.

In some embodiments, the solvent system comprises a polar solvent and a non-polar solvent. In some embodiments, the solvent system comprises at least 50 percent by weight of the polar solvent.

In some embodiments, the hydrosilation catalyst comprises platinum. In some embodiments, the curable release composition further comprises a cure inhibitor.

In another aspect, the present disclosure provides a release liner. In some embodiments, the release liner comprises a substrate and a release layer bonded to the substrate, wherein the release layer comprises the cured coatable release composition according to the present disclosure. For example, in some embodiments, the release liner comprises a substrate and a release layer comprising a cured release composition bonded to the substrate, wherein the release composition comprises an ethylenically unsaturated fluoroorganopolysiloxane polymer; a non-fluorinated organopolysiloxane polymer comprising an average of at least two ethylenically unsaturated organic groups; a hydrosilation catalyst; and at least one crosslinker selected from the group consisting of a fluoroorganohydrogenpolysiloxane and an organohydrogenpolysiloxane.

In yet another aspect, the present disclosure provides an adhesive article. In some embodiments, the adhesive article comprises an adhesive bonded to the release layer of a release liner according to the present disclosure. For example, in some embodiments the adhesive article comprises a release liner comprising a substrate and a cured release composition on at least one surface of the substrate, wherein the release composition comprises an ethylenically unsaturated organopolysiloxane base polymer having a vinyl equivalent weight of 400 to 25,000 grams per equivalent and a weight average molecular weight of 800 to 50,000 grams per mole; an ethylenically unsaturated fluoroorganopolysiloxane polymer; a hydrosilation catalyst; and at least one crosslinker selected from the group consisting of an fluoroorganohydrogenpolysiloxane and an organohydrogenpolysiloxane. The adhesive article further comprises a pressure-sensitive adhesive in contact with the release composition.

In some embodiments, the adhesive article also comprises a backing adhered to the adhesive opposite the release liner. In some embodiments, the backing comprises a foam. In some embodiments, the adhesive comprises a silicone adhesive The above summary of the present disclosure is not intended to describe each embodiment of the present invention. The details of one or more embodiments of the invention are also set forth in the description below. Other features, objects, and advantages of the invention will be apparent from the description and from the claims.

DETAILED DESCRIPTION

Figure 1:
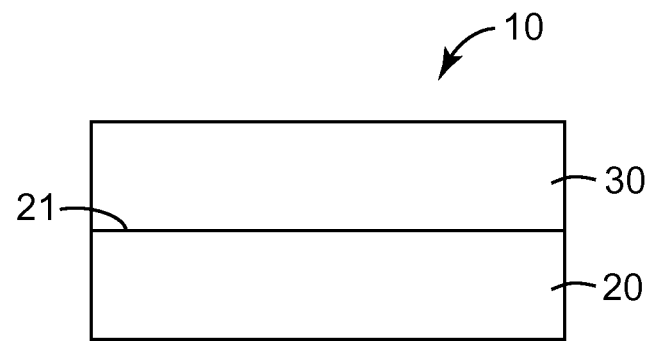
FIG. 1 illustrates an exemplary release liner according to some embodiments of the present disclosure.

Pressure sensitive adhesives (PSAs) are an important class of materials. Generally, PSAs adhere to a substrate with light pressure (e.g., finger pressure) and typically do not require any post-curing (e.g., heat or radiation) to achieve their maximum bond strength. A wide variety of PSA chemistries are available. Silicone PSAs offer one or more of the following useful characteristics: adhesion to low surface energy (LSE) surfaces, quick adhesion with short dwell times, wide use temperature (i.e., performance at high and low temperature extremes), weathering resistance (including resistance to ultraviolet (UV) radiation, oxidation, and humidity), reduced sensitivity to stress variations (e.g., mode, frequency and angle of applied stresses), and resistance to chemicals (e.g., solvents and plasticizers) and biological substances (e.g., mold and fungi).

Fluorinated release coatings are often used with silicone PSAs to provide desired release properties. In some embodiments, the desired release force is no greater than 50 g/25 mm, e.g., no greater than 30 g/25 mm at 180° peel angle and 230 cm/min (90 inches/min). However, the selection of fluorinated release coatings available to achieve the desired release performance is limited, particularly for wet-cast (e.g., solvent-based, water-based, and hot melt coated) silicone PSAs. For example, few release materials provide stable, consistent, smooth release of a wet-cast silicone adhesive.

The most common fluorinated release coatings are fluorosilicone materials, i.e., silicone material comprising at least some fluorine atoms. However, commercially available fluorosilicone release coatings are typically more expensive than many common fluorinated materials as well as silicone release materials.

The present inventors have discovered that fluorosilicone release materials can be blended with one or more non-fluorinated organosilicones while maintaining the desired low release characteristics of the fluorosilicone release material, even when the additional non-fluorinated organosilicone itself is not a release material. In addition, in some embodiments, high blend ratios non-fluorinated to fluorinated materials may be used without detrimentally affecting the readhesion force of the adhesive after removal from the blended release materials of the present disclosure.

Generally, the fluorosilicone blend release material comprises an ethylenically unsaturated fluoroorganopolysiloxane polymer and an organopolysiloxane polymer comprising an average of at least two ethylenically unsaturated organic groups.

Generally, any known fluorosilicone release polymer having at least one ethylenically unsaturated organic group may be used. In some embodiments, the ethylenically unsaturated fluoroorganopolysiloxane polymer comprises an average of at least two ethylenically unsaturated organic groups.

Exemplary fluorosilicone release coatings include release coating compositions derived from organopolysiloxanes having fluorine-containing organic groups and alkenyl groups, an organohydrogensiloxane crosslinking agent, and a platinum-containing catalyst. Other fluorosilicone release coatings may be derived from, e.g., organopolysiloxanes having fluorine-containing organic groups and silicon-bonded hydrogen groups, an alkenyl functional organopolysiloxane, and a platinum-containing catalyst.

In some embodiments, the ethylenically unsaturated fluoroorganopolysiloxane polymer comprises a siloxane backbone and pendant C1 to C6 (e.g., C2 to C6, e.g., C2 to C4) perfluoroalkyl groups bonded to backbone with a linking group. In some embodiments, the linking group is an alkylene group comprising at least two carbon atoms. For example, in some embodiments, the alkylene linking group is —$C_2H_4$—. In some embodiments, the pendant perfluoroalkyl group is —$C_4F_9$. For example, in some embodiments, the ethylenically unsaturated fluoroorganopolysiloxane polymer comprises a siloxane backbone and pendant —$C_4F_9$ groups bonded to the backbone with a —$C_2H_4$— linking group A number of useful commercially available ethylenically unsaturated fluorosilicone polymers are available from Dow Corning Corp. (Midland, Mich.) under the SYL-OFF series of trade designations including, e.g., SYL-OFF FOPS-7785 and SYL-OFF FOPS-7786. Additional useful ethylenically unsaturated fluorosilicone polymers are described as component (e) at column 5, line 67 through column 7, line 27 of U.S. Pat. No. 5,082,706 (Tangney). Other ethylenically unsaturated fluorosilicone polymers are commercially available from General Electric Co. (Albany, N.Y.), and Wacker Chemie (Germany).

Fluorosilicone polymers are particularly useful in forming release coating compositions when combined with a suitable crosslinking agent. One useful crosslinking agent is available under the SYL-OFF Q2-7560 trade designation from Dow Corning Corp. Other useful crosslinking agents are disclosed in U.S. Pat. No. 5,082,706 (Tangney) and U.S. Pat. No. 5,578,381 (Hamada et al.).

The non-fluorinated organopolysiloxane polymers comprise an average of at least two ethylenically unsaturated organic groups. In some embodiments, the non-fluorinated organopolysiloxane polymer has a vinyl equivalent weight of no greater than 60,000 grams per equivalent, e.g., no greater than 20,000, or even no greater than 10,000 grams per equivalent. In some embodiments, the non-fluorinated organopolysiloxane polymer has a vinyl equivalent weight of 2000 to 5000 grams per equivalent, e.g., 2000 to 4000 grams per equivalent, or even 2500 to 3500 grams per equivalent.

Exemplary non-fluorinated organopolysiloxane polymers include those comprising a triorganosiloxy endblocked polydiorganosiloxane polymer. In some embodiments, the non-fluorinated organopolysiloxane polymer comprises $R_2SiO_{2/2}$ units (i.e., "D" units) and $R_3SiO_{1/2}$ units (i.e., "M" units), wherein each R group independently represents a saturated or ethylenically unsaturated, substituted or unsubstituted hydrocarbon radical, provided that at least two R groups contain terminal ethylenic unsaturation.

The ethylenically unsaturated radicals are independently selected from the group consisting of the vinyl radical and higher alkenyl radicals represented by the formula —R'$(CH_2)_mCH$=$CH_2$ wherein R' denotes —$(CH_2)_n$— or —$(CH_2)_pCH$=$CH$— and m has the value of 1, 2, or 3; n has the value of 0, 3, or 6; and p has the value of 3, 4, or 5. In some embodiments, R' denotes —$(CH_2)_n$—. In some embodiments, the alkenyl radicals are selected from the group consisting of the vinyl radical and the 5-hexenyl radical. In some embodiments, the saturated hydrocarbon radical is the methyl radical.

In some embodiments, trace amounts of non-linear siloxane units, i.e., $SiO_{4/2}$ units (i.e., "Q" units) and $RSiO_{3/2}$, units (i.e., "T" units); wherein R is as described above. In some embodiments, trace amounts of other silicon-bonded radicals, such as hydroxyl and alkoxyl may also be present.

Exemplary non-fluorinated organopolysiloxane polymer comprising an average of at least two ethylenically unsaturated organic groups include those having the formula $M^{vi}D_xM^{vi}$, wherein M represents M units, D represents D units, the superscript "vi" indicates the presence of vinyl-functional groups, and x is the degree of polymerization. Commercially available $M^{vi}D_xM^{vi}$ non-fluorinated organopolysiloxane polymers include those available under the trade designations DMS-V from Gelest Inc. (e.g., DMS-V03, DMS-V05, DMS-V21, DMS-V22, DMS-V25, DMS-V35, and DMS-V41).

Other commercially available non-fluorinated organopolysiloxane polymer comprising an average of at least two ethylenically unsaturated organic groups include DOW 2-7120 and DOW 7850 (available from Dow Corning Corporation), 2,4,6,8-tetramethyl-2,4,6,8-tetravinylcyclotetrasiloxane (available from Aldrich), and VMS-T11 and SIT7900 (available from Gelest Inc.).

Generally, the fluorosilicone release blends of the present disclosure comprise 5 to 95 wt. % of the non-fluorinated organopolysiloxane polymer based on the total weight of the ethylenically unsaturated fluoroorganopolysiloxane polymer and the non-fluorinated organopolysiloxane polymer comprising an average of at least two ethylenically unsaturated organic groups. In some embodiments, the blend comprises at least 20 wt. %, at least 50 wt. %, or even at least 75 wt. % of the non-fluorinated organopolysiloxane polymer. In some embodiments, the blend comprises no greater than 90 wt. % or even no greater than 85 wt. % of the non-fluorinated organopolysiloxane polymer.

Generally, the fluorosilicone release blends of the present disclosure further comprise a hydrosilation catalyst. Generally, any known hydrosilation catalyst may be used. Exemplary hydrosilation catalysts include organo-complexed transition metals including cobalt, rhodium, palladium, ruthenium, nickel, or platinum. Exemplary platinum hydrosilation catalysts include platinum-divinyltetramethyldisiloxane, platinum carbonyl cyclovinylmethylsiloxane, platinum cyclovinylmethylsiloxane, platinum-octanal/octanol complex, and hexachloroplatinic acid. Commercially available hydrosilation catalysts include, e.g., those available under the trade names SYL-OFF 3000 Catalyst sand SYL-OFF 4000 Catalyst from Dow Corning Corporation. For further details regarding hydrosilation catalysts see, e.g., Speier et al., U.S. Pat. No. 2,823,218; Willing, U.S. Pat. No. 3,419,593; Karstedt, U.S. Pat. Nos. 3,715,334 and 3,814,730; Ashby, U.S. Pat. No. 4,421,903; Lamoreaux, U.S. Pat. No. 3,220,972; Chandra et al., U.S. Pat. No. 4,603,215; Lewis, U.S. Pat. No. 4,705,765; Drahnak, U.S. Pat. Nos. 4,510,094 and 4,530,879; Eckberg, U.S. Pat. No. 4,670,531; Boardman et al., U.S. Pat. No. 4,916,169; and Oxman et al., U.S. Pat. No. 5,145,886.

The amount of catalyst used depends on a variety of factors and one of ordinary skill in the art can optimize the amount of catalyst based on such factors. In some embodiments, the blends of the present disclosure include 50 to 400 ppm of transition metal (e.g., platinum), e.g., 100 to 200 ppm of transition metal (e.g., platinum).

The blends of the present disclosure may also optionally contain an effective amount of an inhibitor for the metal hydrosilylation catalyst. As is well known, preferred inhibitors reduce the activity of the metal catalyst at room temperature thus increasing the time period during which the composition may be used at room temperature while still allowing rapid cure at elevated temperatures. Hydrosilylation catalyst inhibitors are well known in the art and include such compounds as pyridine, acrylonitrile, diallyl maleate, 2-methyl-3-buten-2-ol, organic phosphines and phosphites, benzotriazole, organic sulfoxides, aminofunctional siloxanes, ethylenically unsaturated isocyanurates, olefinic siloxanes, alkenynes, unsaturated carboxylic esters, and unsaturated carboxylic amides.

Generally, the fluorosilicone release blends of the present disclosure also include at least one crosslinker. In some embodiments, the crosslinker is a fluoroorgano-hydrogenpolysiloxane crosslinker. In some embodiments, the crosslinker is a non-fluorinated organohydrogenpolysiloxane crosslinker. In some embodiments, the blend contains both at least one fluoroorganohydrogenpolysiloxane crosslinker and at least one non-fluorinated organohydrogenpolysiloxane crosslinker.

Typically, both the fluoro- and non-fluorinated organohydrogenpolysiloxane crosslinkers contain an average of at least three silicon-bonded hydrogen atoms per molecule. In some embodiments, the crosslinkers comprise $R_3SiO_{1/2}$ units (i.e., M units) $HR_2SiO_{1/2}$ units (i.e., $M^H$ units), $R_2SiO_{2/2}$ units (i.e., D units), $HRSiO_{2/2}$ units (i.e., DH units), $RSiO_{3/2}$ units (i.e., T units), and $SiO_{4/4}$ units (i.e., Q units). Each R group independently represents a saturated or ethylenically unsaturated, substituted or unsubstituted hydrocarbon radical. In some embodiments, R is the methyl radical. With respect to the fluoroorganohydrogenpolysiloxane crosslinker, at least one of the R groups is a fluoro-containing R group, e.g., a fluoroalkyl radical.

Exemplary fluoroorganohydrogenpolysiloxane crosslinkers include

H—SiMe$_2$-O—(SiMeH—O)$_n$—(SiMe(C$_2$H$_4$CF$_3$)—O)$_m$—SiMe$_2$-H,
H—SiMe$_2$-O—(SiMeH—O)$_n$—(SiMe(C$_2$H$_4$C$_4$F$_9$)—O)$_m$—SiMe$_2$-H,
H—SiMe$_2$-O—(SiMeH—O)$_n$—(SiMe(C$_2$H$_4$C$_6$F$_{13}$)—O)$_m$SiMe$_2$-H,
H—SiEt$_2$-O—(SiEtH—O)$_n$—(SiMe(C$_2$H$_4$CF$_3$)—O)$_m$SiEt$_2$-H;
H—SiEt$_2$-O—(SiEtH—O)$_n$—(SiMe(C$_2$H$_4$C$_4$F$_9$)—O)$_m$—SiEt$_2$-H,
H—SiMe$_2$-O—(SiMeH—O)$_n$—(SiMe(C$_2$H$_4$CF$_3$)—O)$_m$—(SiMe$_2$-O)$_p$—SiMe$_2$-H,
H—SiMe$_2$-O—(SiMeH—O)$_n$—(SiMe(C$_2$H$_4$C$_4$F$_9$—O)$_m$(SiMe$_2$-O)$_p$—SiMe$_2$-H,
H—SiMe$_2$-O—(SiMeH—O)$_n$—(SiMe(C$_2$H$_4$C$_6$F$_{13}$)—O)$_m$—(SiMe$_2$-O)$_o$—SiMe$_2$-H,
H—SiMe$_2$-O—(SiMeH—O)$_n$—(SiMe(C$_2$H$_4$CF$_3$)—O)$_m$—(SiMePh-O)O—SiMe$_2$-H,
H—SiMe$_2$-O—(SiMeH—O)$_n$—(SiMe(C$_2$H$_4$C$_4$F$_9$)—O)$_m$—(SiMePh-O)O—SiMe$_2$-H,
Me$_3$Si—O—(SiMeH—O)$_n$—(SiMe(C$_2$H$_4$CF$_3$)—O)$_m$—SiMe$_3$,
Me$_3$Si—O—(SiMeH—O)$_n$—(SiMe(C$_2$H$_4$C$_4$F$_9$)—O)$_m$—SiMe$_3$,
Me$_3$Si—O—(SiMeH—O)$_n$—(SiMe(C$_2$H$_4$C$_6$F$_{13}$)—O)$_m$—SiMe$_3$,
Me$_3$Si—O—(SiMeH—O)$_n$—(SiMe(C$_2$H$_4$CF$_3$)—O)$_m$—SiMe$_2$-O)$_p$—SiMe$_3$,
Me$_3$Si—O—(SiMeH—O)$_n$—(SiMe(C$_2$H$_4$C$_4$F$_9$)—O)$_n$(SiMe$_2$-O)$_p$—SiMe$_3$,
Me$_3$Si—O—(SiMeH—O)$_n$—(SiMe(C$_2$H$_4$C$_6$F$_{13}$)—O)$_n$(SiMe$_2$-O)$_p$—SiMe$_3$,
Me$_3$Si—O—(SiMeH—O)$_n$—(SiMe(C$_2$H$_4$CF$_3$)—O)$_m$—(SiMePh-O)$_p$—SiMe$_3$, and
Me$_3$Si—O—(SiMeH—O)$_n$—(SiMe(C$_2$H$_4$C$_4$F$_9$)—O)$_m$—(SiMePh-O)$_p$—SiMe$_3$.

Commercially available fluoroorganohydrogenpolysiloxane crosslinkers include DOW 7560 available from Dow Chemical Co.

Exemplary non-fluorinated organohydrogenpolysiloxane crosslinkers include

H—SiMe$_2$-(O—SiMe$_2$)$_n$—OSiMe$_2$-H,
H—SiMe$_2$-(O—SiHMe)$_n$-OSiMe$_2$-H,
H—SiMe$_2$-O—(SiHMe-O)$_n$—(SiMe$_2$-O)$_m$—SiMe$_2$-H,
H—SiMe$_2$-O—(SiPh(OSiHMe$_2$)—O)$_n$—SiMe$_2$-H,
H—SiMe$_2$-O—(SiHMe-O)$_n$—(SiMePh-O)$_m$—SiMe$_2$-H,
Me$_3$Si—O—(SiHMe-O)$_n$—SiMe$_3$,
Me$_3$Si—O—(SiHMe-O)$_n$—(SiMe$_2$-O)$_m$—SiMe$_3$,
Me$_3$Si—O—(SiHMe-O)$_n$—(SiMePh-O)$_m$—SiMe$_3$,
Et$_3$Si—O—(SiHEt-O)$_n$—SiEt$_3$, and
Me$_3$Si—O—(SiHMe-O)$_n$—(SiMeC$_8$H$_{17}$—O)$_m$—SiMe$_3$.

Commercially available non-fluorinated organohydrogenpolysiloxane crosslinkers include DOW 7048, 7678, and 7488, available from Dow Chemical Co.

Generally, the fluorosilicone release composition is dissolved in a solvent system. The solvents are selected to be compatible with the release composition. In some embodiments, the solvent system comprises both a polar solvent and a non-polar solvent. In some embodiments, the solvent system comprises at least 50 wt. % polar solvents.

Exemplary polar solvents include esters, such as ethyl acetate; aromatic solvents such as toluene and trifluoroemthyl toluene; ethers, such as diethyl ether, methyl perfluorobutyl ether, ethyl perfluorobutyl ether, t-butyl ether, methyl ether and tetrahydrofuran; and ketones, such as acetone, methyl ethyl ketone and methyl isobutyl ketone. Exemplary non-polar solvents include aliphatic hydrocarbon solvents such as heptane, hexane and cyclohexane.

The blended release composition of the present disclosure may be useful with a wide variety of adhesives. Generally, fluorosilicone-based release materials are used with silicone adhesives. Examples of suitable silicone polymers useful in the formulation of a silicone adhesive include silicones, silicone polyurea block copolymers, polydiorganosiloxane polymers, silicone polyamides, polysiloxane grafted copolymers, and mixtures thereof.

One class of silicone adhesives includes those having a siloxane backbone, e.g., poly(diorganosiloxane) materials. Exemplary poly(diorganosiloxane) materials include poly (dialkyl siloxane), e.g., poly(dimethyl siloxane); poly(alkylaryl siloxane), e.g., poly(methylphenyl siloxane) and poly (dimethyldiphenyl siloxane); and poly(diaryl siloxane), e.g., poly(diphenyl siloxane). In some embodiments, the adhesive may comprise two or more poly(diorganosiloxane) materials.

Generally, the silicone-based pressure-sensitive adhesive composition may include other components including, e.g., tackifying agents, plasticizers and combinations thereof. In some embodiments, the adhesives further comprise a suitable tackifier. Generally, any known tackifying resin may be used, e.g., in some embodiments, silicate tackifying resins may be used. In some exemplary adhesive compositions, a plurality of silicate tackifying resins can be used to achieve desired performance.

Suitable silicate tackifying resins include those resins composed of the following structural units M (i.e., monovalent $R'_3SiO_{1/2}$ units), D (i.e., divalent $R'_2SiO_{2/2}$ units), T (i.e., trivalent $R'SiO_{3/2}$ units), and Q (i.e., quaternary $SiO_{4/2}$ units), and combinations thereof. Typical exemplary silicate resins include MQ silicate tackifying resins, MQD silicate tackifying resins, and MQT silicate tackifying resins. These silicate tackifying resins usually have a number average molecular weight in the range of 100 to 50,000-gm/mole, e.g., 500 to 15,000 gm/mole and generally R' groups are methyl groups.

MQ silicate tackifying resins are copolymeric resins where each M unit is bonded to a Q unit, and each Q unit is bonded to at least one other Q unit. Some of the Q units are bonded to only other Q units. However, some Q units are bonded to hydroxyl radicals resulting in $HOSiO_{3/2}$ units (i.e., "$T^{OH}$" units), thereby accounting for some silicon-bonded hydroxyl content of the silicate tackifying resin.

MQD silicone tackifying resins are terpolymers having M, Q and D units. In some embodiments, some of the methyl R' groups of the D units can be replaced with vinyl (CH2=CH—) groups ("$D^{Vi}$" units). MQT silicate tackifying resins are terpolymers having M, Q and T units.

Silicate tackifying resins are commercially available from, e.g., Dow Corning (e.g., DC-7066), and Momentive Performance Materials (e.g., SR545 and SR1000).

One suitable silicone-based pressure-sensitive adhesive composition includes a MQ tackifying resin and a silicone polymer. The MQ tackifying resin and the silicone polymer can be present in the form of, e.g., a blend of MQ tackifying resin and silicone polymer, a reaction product of MQ tackifying resin and silicone polymer, e.g., a condensation cure or addition cure type reaction product, or a mixture thereof.

Another example of a useful class of silicone polymers is silicone polyurea block copolymers. Silicone polyurea block copolymers include the reaction product of a polydiorganosiloxane diamine (also referred to as silicone diamine), a diisocyanate, and optionally an organic polyamine.

Yet another example of a useful class of silicone polymers is polydiorganosiloxane-polyoxamide copolymer silicone adhesives. Useful polydiorganosiloxane-polyoxamide copolymer silicone adhesives are disclosed in, e.g., U.S. Pat. No. 7,371,464 (Sherman).

Wide ranges of commercially available silicone pressure-sensitive adhesive compositions are also suitable. Examples of such silicone pressure-sensitive adhesive compositions include Dow Corning's 280A, 282, 7355, 7358, 7502, 7657, Q2-7406, Q2-7566 and Q2-7735; General Electric's PSA 590, PSA 600, PSA 595, PSA 610, PSA 518 (medium phenyl content), PSA 6574 (high phenyl content), and PSA 529, PSA 750-D1, PSA 825-D1, and PSA 800-C. Also useful are various blends of silicone pressure-sensitive adhesive compositions, such as blends of two different dimethylsiloxane-based silicone pressure-sensitive adhesive compositions, or blends of dimethylsiloxane-based silicone pressure-sensitive adhesive compositions with dimethylsiloxane/diphenylsiloxane-based pressure-sensitive adhesive compositions.

EXAMPLES

The materials used in the following examples are summarized in Tables 1A-1D.

TABLE 1A

Vinyl terminal functional PDMS ($M^{Vi}D_xM^{Vi}$) available from Gelest Inc.

| Polymer ID | Viscosity (cPs) | Molecular Weight | Polymer DP (x) | Vinyl Eq. Wt. | SiH/C=C Ratio |
|---|---|---|---|---|---|
| DMS-V03 | 2-3 | 500 | 4.2 | 250 | 1.1 |
| DMS-V21 | 100 | 6000 | 78.4 | 3000 | 1.5 |
| DMS-V22 | 200 | 9400 | 124.2 | 4700 | 1.5 |
| DMS-V25 | 500 | 17,200 | 229.4 | 8600 | 2 |
| DMS-V35 | 5000 | 49,500 | 665.0 | 24,750 | 5 |
| DMS-V41 | 10000 | 62,700 | 843.0 | 31,350 | 7.5 |
| DMS-V46 | 60000 | 117,000 | 1575.2 | 58,500 | 13 |
| DMS-V51 | 100000 | 140,000 | 1885.4 | 70,000 | 13 | x = degree of polymerization

TABLE 1B

Other functional PDMS materials.

| Polymer ID | Structure | Structure | DP | Molecular Weight | Vinyl Eq. Wt. | Source |
|---|---|---|---|---|---|---|
| DOW 2-7170 | Vinyl end functional | $M^{Vi}D_{130}M^{Vi}$ | 130 | 9826 | 4913 | Dow Chemical |
| DOW 7850 | Hexenyl end and terminal functional | $M^{Hex}D_2{}^{Hex}D_{148}M^{Hex}$ | 150 | 11,446 | 2862 | Dow Chemical |
| VMS-T11 | Vinyl pendant | $MD_{13}{}^{Vi}M$ | 13 | 1280 | 99 | Gelest Inc. |
| SIT7900 | Cyclic vinyl functional | $D_4{}^{Vi}$ | n/a | 345 | 86.3 | Gelest Inc. |

TABLE 1C

Vinyl functional fluorosilicone materials.

| Polymer ID | Structure | Structure | DP | Molecular Weight | Vinyl Eq. Wt. |
|---|---|---|---|---|---|
| CF3 (a) | Vinyl end functional fluorosilicone | $M^{Vi}D_9{}^{Rf1}D_{51}M^{Vi}$ | 60 | 5200 | 2600 |

TABLE 1C-continued

Vinyl functional fluorosilicone materials.

| Polymer ID | Structure | Structure | DP | Molecular Weight | Vinyl Eq. Wt. |
|---|---|---|---|---|---|
| DOW 7785 (b) | vinyl end and pendent functional fluorosilicone | $M^{Vi}D_6^{Vi}D_{300}^{Rf2}D_{600}M^{Vi}$ | 1006 | 136,902 | 17,112 |
| DOW 7786 (b) | Vinyl end functional fluorosilicone | $M^{Vi}D_{30}^{Rf2}D_{30}M^{Vi}$ | 60 | 11,586 | 5793 |

(a) MOMENTIVE FSR 2000 available from Momentive Performance Materials, Inc.
(b) Available from Dow Chemical Co., includes Pt catalyst and inhibitor as supplied.
Rf1 = —$CH_2CH_2CF_3$
Rf2 = —$CH_2CH_2CF_2CF_2CF_2CF_3$

TABLE 1D

Crosslinkers.

| Polymer ID | Structure | Structure | DP | Molecular Weight | Vinyl Eq. Wt. |
|---|---|---|---|---|---|
| DOW 7048 | Hydride pendent functional non-fluorinated crosslinker | $MD_{40}^{H}M$ | 40 | 2586 | 64.6 |
| DOW 7678 | Hydride pendent functional non-fluorinated crosslinker | $MD_{12}D_{28}^{H}M$ | 40 | 2754 | 98.4 |
| DOW 7488 | Hydride pendent functional non-fluorinated crosslinker | 50/50 wt/wt blend of 7048 and 7678 | 40 | 2670 | 81.5 |
| DOW 7560 | Hydride pendent functional fluorinated crosslinker | $MD_{12}^{Rf2}D_{28}^{H}M$ | 40 | 5514 | 197 g/eq SiH |

Rf2 = —$CH_2CH_2CF_2CF_2CF_2CF_3$

ADH-1. This poly(dimethyl siloxane) ("PDMS") based silicone adhesive was prepared as follows. A peroxide solution was made by adding 3.0 g of peroxide paste (SID 3352.0 from Gelest), 7.2 g of toluene and 1.8 g of MEK. The paste contained 50% dichlorobenzoyl peroxide and 50% silicone fluid. The resulting peroxide solution was 25% solids with a 80:20 weight ratio of toluene:MEK. 100 g of Q2-7735 silicone pressure-sensitive adhesive (56% solids, available from Dow Chemical Co.), 58.6 g of toluene and 2.24 g of the peroxide solution were mixed. This yielded an adhesive solution containing 0.5 wt. % (based on adhesive solids) of active dichlorobenzoyl peroxide at a final solids content of 35%. The composition was put on a jar roller overnight to dissolve, producing the adhesive solution.

The adhesive solution was notch bar coated onto a substrate with a wet gap of 280 microns (11 mils). The coated adhesive is then dried and cured in a forced air oven at 150° C. for 5 minutes to yield an approximately 50 microns (2 mils) thick, dry, pressure sensitive adhesive layer.

ADH-2. This tackified, polydiorganosiloxane-polyurea block copolymer silicone adhesive was prepared as follows. A silicone polyurea pressure-sensitive adhesive was prepared according to the procedure provided in U.S. Pat. No. 6,730, 397 in the section titled "Preparation of Silicone Polyurea Polymer," with the following exceptions. The silicone polyurea elastomer was prepared at 20% solids rather than 30%, and the elastomer was prepared in a solvent blend having a toluene/2-propanol weight ratio of 75/25 rather than 70/30. The resulting elastomer was formulated into a silicone polyurea pressure-sensitive adhesive composition by combining 63 parts by weight elastomer solution, 24.3 parts of an MQ resin, 11.63 parts toluene, and 1.08 parts 2-propanol, and mixing well to assure homogeneity. The MQ resin was treated to reduce the silanol content and consisted of M, Q, and $T^{OH}$ structural units, having an M/Q ratio of 1.2, SiOH content of 0.8%, Mn=2820, Mw=4600, at 63.4% solids by weight in xylene.

ADH-3. ADH-3 was a crosslinked acrylic copolymer of isooctyl acrylate, isobornyl acrylate, and acrylic acid. ADH-3 was tackified with a partially hydrogenated hydrocarbon tackifier (REGALREZ 6108 from Eastman Chemicals).

Sample Preparation. Samples were prepared for testing using either a Dry Lamination process or a Wet Casting process. For dry lamination the adhesive was coated on 50 micron (2.0 mil) primed PET film (product 3SAB from Mitsubishi) and dried. The adhesive of the resulting PET-backed tape was laminated to the release liner using two passes of a 2 kg rubber roller. For wet casting, the adhesive was coated directly on to the release coated liner and dried. The 50 micron PET film was then laminated to the dried adhesive forming the PET-backed tape adhered to a liner.

Release Test Procedure. PET-backed tape samples were peeled from the liner at an angle of 180° and at a rate of 230 cm/min (90 inches/minute). An IMass model SP2000 peel tester obtained from IMASS, Inc., Accord, Mass., was used to record the peel force.

Readhesion Test Procedure. To determine the readhesion value, PET-backed tape samples were peeled from the liner using the Release Test method and the tape was then applied to the surface of a clean stainless steel panel. The tape sample was rolled down against the panel by means of two passes with a 2 kg rubber roller at 61 cm/min (24 inches/min). The readhesion value was a measure of the force required to pull the tape from the steel surface at an angle of 180° at a rate of 30.5 cm/min (12 inches/minute). The IMass model SP2000 peel tester was used to record the peel force.

Non-fluorinated organopolysilioxane solutions.

Base polymers having the general formula $M^{Vi}D_xM^{Vi}$; where x is the polymer degree of polymerization ("DP") were obtained from Gelest, Inc. and are summarized in Table 1A. A silicone based release coating was made by adding 150 ppm platinum (4000 Pt catalyst from Dow Corning, approximately 5000 ppm Pt concentration) to each of the vinyl-terminated polydimethylsiloxane base polymers. To this was also added 0.25 wt % of diallyl maleate inhibitor. The resulting solution was mixed until homogenous.

The catalyzed and inhibited solutions were further diluted to 10% solids with solvent (80/20 ethyl acetate/heptane wt/wt) and an appropriate amount of a silane functional crosslinker (Dow 7488, 82 g/eq SiH) were added to give an excess of silane functionality based on the vinyl content of the polymer. The SiH/C=C ratio was chosen to obtain the minimum level of SiH necessary for complete cure of the silicone release system. The SiH/C=C ratio is summarized in Table 1E.

TABLE 1E

Non-fluorinated organopolysilioxane solutions (NFOPS).

| ID | Base Polymer | Vinyl Eq. Wt. | SiH/C=C ratio |
|---|---|---|---|
| NFOPS-1 | DMS-V03 | 250 | 1.1 |
| NFOPS-2 | DMS-V21 | 3000 | 1.5 |
| NFOPS-3 | DMS-V22 | 4700 | 1.5 |
| NFOPS-4 | DMS-V25 | 8600 | 2 |
| NFOPS-5 | DMS-V35 | 24750 | 5 |
| NFOPS-6 | DMS-V41 | 31350 | 7.5 |

Fluorinated Organopolysilioxane Solutions.

FOPS-7785. A fluorinated organopolysiloxane solution was prepared by combining of 97 wt. % FOPS-7785 vinyl end and pendent functional fluorosilicone and 3 wt. % 7560 hydride pendent functional fluorinated crosslinker as a 10 wt. % solution in 4:1 ethyl acetate and heptane solvent system. As supplied, the FOPS-7785 includes a platinum catalyst and an inhibitor.

FOPS-7786. A fluorinated organopolysiloxane solution was prepared by combining of 93 wt. % FOPS-7786 vinyl end functional fluorosilicone and 7 wt. % 7560 hydride pendent functional fluorinated crosslinker as a 10 wt. % solution in 4:1 ethyl acetate and heptane solvent system. As supplied, the FOPS-7786 includes a platinum catalyst and an inhibitor.

FOPS-CFS. A fluorinated organopolysiloxane solution was prepared by combining of 96 wt. % $CF_3$ vinyl end functional fluorosilicone, 3.4 wt. % SS-4300C non-fluorinated, hydride functional silicone crosslinker (available from Momentive Performance Materials), and 0.6 wt. % SL6040 diallyl maleate inhibitor (available from Momentive Performance Materials) as a 10 wt. % solution in heptane solvent system.

DATA SET A. NFOPS-2 non-fluorinated organopolysiloxane solution (based on DMS-V21) was blended with various fluoroorganopolysiloxanes solutions, coated onto Mitsubishi 2.0 mil 3SAC primed PET film using a #6 Mayer bar, and cured at 120° C. for 5 minutes. ADH-1 was dry laminated and wet cast on the cured release coatings per the Sample Preparation Procedure. These constructions were conditioned for either six days at 22° C. (6d-CT) or six days at 70° C. (6d-HT). The conditioned samples were evaluated using the Release Test Procedure and the Readhesion Test Procedure. The results of the dry laminated samples are summarized in Table 2A. The results of the wet cast samples are summarized in Table 2B.

TABLE 2A

Release and Readhesion results for dry laminated ADH-1 adhesive and a blend of a fluoroorganopolysiloxane polymer and a non-fluorinated organosiloxane polymer.

| Blend | Non-fl polymer | Fluorinated polymer | NF:F ratio | Release (g/25 mm) 6d-CT | Release (g/25 mm) 6d-HT | Readhesion (g/25 mm) 6d-CT | Readhesion (g/25 mm) 6d-HT |
|---|---|---|---|---|---|---|---|
| CE-A1 | none | FOPS-7786 | 0:100 | 29.7 | 10.8 | 1710 | 1750 |
| EX-A1 | NFOPS-2 | FOPS-7786 | 25:75 | 44.5 | 40.5 | 1700 | 1720 |
| EX-A2 | NFOPS-2 | FOPS-7786 | 50:50 | 32.9 | 20.4 | 1650 | 1750 |
| EX-A3 | NFOPS-2 | FOPS 7786 | 75:25 | 7.5 | 10.4 | 1630 | 1800 |
| CE-A2 | none | FOPS-7785 | 0:100 | 372 | 29.7 | 1490 | 1180 |
| EX-A4 | NFOPS-2 | FOPS-7785 | 25:75 | 187 | 133 | 1580 | 1690 |
| EX-A5 | NFOPS-2 | FOPS-7785 | 50:50 | 89.8 | 108 | 1670 | 1330 |
| EX-A6 | NFOPS-2 | FOPS-7785 | 75:25 | 87.5 | 10.3 | 1750 | 1430 |
| CE-A3 | NFOPS-2 | none | 100:0 | 743 | 1470 | 1420 | 1140 |

NF:F = weight ratio of non-fluorinated organopolysiloxane to fluoroorganopolysiloxane.

TABLE 2B

Release and Readhesion results for wet cast ADH-1 adhesive and a blend of a fluoroorganopolysiloxane polymer and a non-fluorinated organosiloxane polymer.

| Blend | Non-fluorinated polymer | Fluorinated polymer | NF:F ratio | Release (g/25 mm) 6d-CT | Release (g/25 mm) 6d-HT | Readhesion (g/25 mm) 6d-CT | Readhesion (g/25 mm) 6d-HT |
|---|---|---|---|---|---|---|---|
| CE-A1 | none | FOPS-7786 | 0:100 | 7 | 13 | 1704 | 1868 |
| EX-A1 | NFOPS-2 | FOPS-7786 | 25:75 | 25 | 40 | 1660 | 1709 |
| EX-A2 | NFOPS-2 | FOPS-7786 | 50:50 | 8 | 14 | 1751 | 1689 |
| EX-A3 | NFOPS-2 | FOPS-7786 | 75:25 | 5 | 10 | 1656 | 1690 |
| CE-A2 | none | FOPS-7785 | 0:100 | 182 | 380 | 1730 | 1232 |
| EX-A4 | NFOPS-2 | FOPS-7785 | 25:75 | 21 | 232 | 1662 | 1500 |

TABLE 2B-continued

Release and Readhesion results for wet cast ADH-1 adhesive and a blend of a fluoroorganopolysiloxane polymer and a non-fluorinated organosiloxane polymer.

| Blend | Non-fluorinated polymer | Fluorinated polymer | NF:F ratio | Release (g/25 mm) 6d-CT | Release (g/25 mm) 6d-HT | Readhesion (g/25 mm) 6d-CT | Readhesion (g/25 mm) 6d-HT |
|---|---|---|---|---|---|---|---|
| EX-A5 | NFOPS-2 | FOPS-7785 | 50:50 | 36 | 563 | 1689 | 1085 |
| EX-A6 | NFOPS-2 | FOPS-7785 | 75:25 | 46 | 1841 | 1704 | 1160 |
| CE-A3 | NFOPS-2 | none | 100:0 | 1707 | (*) | 1477 | — |

(*) 2-Bond failure (release force exceed bond force between the adhesive and the backing.)

DATA SET B. NFOPS-2 non-fluorinated organopolysiloxane (based on DMS-V21) was blended with the FOPS-7785 fluoroorganopolysiloxane material, coated onto Mitsubishi 2.0 mil 3SAC primed PET film using a #6 Mayer bar, and cured at 120° C. for 5 minutes. ADH-1 was dry laminated and wet cast on the cured release coatings per the Sample Preparation Procedure. These constructions were conditioned for seven days at 22° C. (7d-CT) or seven days at 70° C. (7d-HT). The conditioned samples were evaluated using the Release Test Procedure and the Readhesion Test Procedure. The results of the dry laminated samples are summarized in Table 3A. The results of the wet cast samples are summarized in Table 3B.

TABLE 3A

Release and Readhesion results for dry laminated ADH-1 adhesive and a blend of a fluoroorganopolysiloxane polymer and a non-fluorinated organosiloxane polymer.

| Blend | Non-fluorinated polymer | Fluorinated polymer | NF:F ratio | Release (g/25 mm) 7d-CT | Release (g/25 mm) 7d-HT | Readhesion (g/25 mm) 7d-CT | Readhesion (g/25 mm) 7d-HT |
|---|---|---|---|---|---|---|---|
| CE-B1 | none | FOPS-7785 | 0:100 | 9.1 | 13.1 | 1630 | 1790 |
| EX-B1 | NFOPS-2 | FOPS-7785 | 25:75 | 23.2 | 28.1 | 1670 | 1840 |
| EX-B2 | NFOPS-2 | FOPS-7785 | 50:50 | 101 | 90.3 | 1670 | 1780 |
| EX-B3 | NFOPS-2 | FOPS-7785 | 75:25 | 100 | 147 | 1690 | 1820 |
| CE-B2 | NFOPS-2 | none | 100:0 | 1323 | 1824 | 720 | 1200 |

TABLE 3B

Release and Readhesion results for wet cast ADH-1 adhesive and a blend of a fluoroorganopolysiloxane polymer and a non-fluorinated organosiloxane polymer.

| Blend | Non-fluorinated polymer | Fluorinated polymer | NF:F ratio | Release (g/25 mm) 7d-CT | Release (g/25 mm) 7d-HT | Readhesion (g/25 mm) 7d-CT | Readhesion (g/25 mm) 7d-HT |
|---|---|---|---|---|---|---|---|
| CE-B1 | none | FOPS-7785 | 0:100 | 19.9 | 25.7 | 1790 | 1990 |
| EX-B1 | NFOPS-2 | FOPS-7785 | 25:75 | 25.5 | 96.5 | 1820 | 1940 |
| EX-B2 | NFOPS-2 | FOPS-7785 | 50:50 | 30.5 | 360 | 1810 | 1720 |
| EX-B3 | NFOPS-2 | FOPS-7785 | 75:25 | 62.5 | 2140 | 1830 | 1440 |
| CE-B2 | NFOPS-2 | none | 100:0 | 104 | 0 | 1960 | 0 |

DATA SET C. NFOPS-1 non-fluorinated organopolysiloxane (based on DMS-V03) was blended with the FOPS-7786 fluoroorganopolysiloxane material, coated onto Mitsubishi 2.0 mil 3SAC primed PET film using a #6 Mayer bar, and cured at 120° C. for 5 minutes. ADH-1 was dry laminated and wet cast on the cured release coatings per the Sample Preparation Procedure. These constructions were conditioned for eight days at 22° C. (8d-CT) or eight days at 70° C. (8d-HT). The conditioned samples were evaluated using the Release Test Procedure and the Readhesion Test Procedure. The results of the dry laminated and wet cast samples are summarized in Tables 4A and 4B, respectively.

TABLE 4A

Release and Readhesion results for dry laminated ADH-1 adhesive and a blend of a fluoroorganopolysiloxane polymer and a non-fluorinated organosiloxane polymer.

| Blend | Non-fluorinated polymer | Fluorinated polymer | NF:F ratio | Release (g/25 mm) 8d-CT | Release (g/25 mm) 8d-HT | Readhesion (g/25 mm) 8d-CT | Readhesion (g/25 mm) 8d-HT |
|---|---|---|---|---|---|---|---|
| CE-C1 | none | FOPS-7786 | 0:100 | 23.9 | 11.9 | 1620 | 1800 |
| EX-C1 | NFOPS-1 | FOPS-7786 | 25:75 | 16.1 | 22.3 | 1660 | 1840 |
| EX-C2 | NFOPS-1 | FOPS-7786 | 50:50 | 50.9 | 53.5 | 1670 | 1920 |
| EX-C3 | NFOPS-1 | FOPS-7786 | 75:25 | 36.0 | 70.9 | 1720 | 1940 |
| CE-C2 | NFOPS-1 | none | 100:0 | 1110 | 1800 | 1150 | 1240 |

TABLE 4B

Release and Readhesion results for wet cast ADH-1 adhesive.

| Blend | Non-fluorinated polymer | Fluorinated polymer | NF:F ratio | Release (g/25 mm) 8d-CT | Release (g/25 mm) 8d-HT | Readhesion (g/25 mm) 8d-CT | Readhesion (g/25 mm) 8d-HT |
|---|---|---|---|---|---|---|---|
| CE-B1 | none | FOPS-7785 | 0:100 | 8.1 | 15.7 | 1710 | 1990 |
| EX-B1 | NFOPS-1 | FOPS-7785 | 25:75 | 10.3 | 16.2 | 1590 | 2010 |
| EX-B2 | NFOPS-1 | FOPS-7785 | 50:50 | 10.7 | 19.1 | 1690 | 1930 |
| EX-B3 | NFOPS-1 | FOPS-7785 | 75:25 | 6.9 | 67.5 | 1780 | 1880 |
| CE-B2 | NFOPS-1 | none | 100:0 | 53.0 | (*) | 1780 | — |

(*) 2-Bond = release force exceed bond force between the adhesive and the backing.

DATA SET D. NFOPS-2 non-fluorinated organopolysiloxane (based on DMS-V21) was blended with the FOPS-7786 fluoroorganopolysiloxane material, coated onto Mitsubishi 2.0 mil 3SAC primed PET film using a #6 Mayer bar, and cured at 120° C. for minutes. ADH-1 was dry laminated on the cured release coatings per the Sample Preparation Procedure. These constructions were conditioned for seven days at 22° C. (7d-CT), seven days at 70° C. (7d-HT), thirty days at 22° C. (30d-CT), or thirty days at 70° C. (30d-HT). The conditioned samples were evaluated using the Release Test Procedure and the Readhesion Test Procedure. The results are summarized in Table 5.

TABLE 5

Release and Readhesion results for dry laminated ADH-1 and a blend of fluoroorganopolysiloxane polymer and non-fluorinated organosiloxane polymer.

| Blend | NF:F ratio | Release (g/25 mm) 8d-CT | Release (g/25 mm) 8d-HT | Release (g/25 mm) 30d-CT | Release (g/25 mm) 30d-HT | Readhesion (g/25 mm) 8d-CT | Readhesion (g/25 mm) 8d-HT | Readhesion (g/25 mm) 30d-CT | Readhesion (g/25 mm) 30d-HT |
|---|---|---|---|---|---|---|---|---|---|
| CE-D1 | 0:100 | 29.7 | 16.2 | 26.9 | 21.9 | 1600 | 1740 | 1870 | 1800 |
| EX-D1 | 25:75 | 24.2 | 15.8 | 13.5 | 12.3 | 1690 | 1800 | 1910 | 1800 |
| EX-D2 | 50:50 | 7.7 | 6.9 | 8.5 | 10.1 | 1550 | 1700 | 1940 | 1840 |
| EX-D3 | 75:25 | 10.8 | 6.4 | 6.0 | 10.2 | 1550 | 1650 | 1740 | 1730 |
| EX-D4 | 80:20 | 4.7 | 7.4 | 6.9 | 7.1 | 1640 | 1740 | 1720 | 1780 |
| EX-D5 | 90:10 | 5.9 | 8.0 | 6.4 | 6.4 | 1530 | 1760 | 1720 | 1720 |
| CE-D2 | 100:0 | 1370 | 1880 | 1190 | 1660 | 1160 | 1250 | 1410 | 1440 |

DATA SET E. NFOPS-4 non-fluorinated organopolysiloxane (based on DMS-V25) was blended with the FOPS-7786 fluoroorganopolysiloxane material, coated onto Mitsubishi 2.0 mil 3SAC primed PET film using a #6 Mayer bar, and cured at 120° C. for 5 minutes. ADH-1 was dry laminated on the cured release coatings per the Sample Preparation Procedure. These constructions were conditioned for five days at 22° C. (5d-CT) or five days at 70° C. (5d-HT). The conditioned samples were evaluated using the Release Test Procedure and the Readhesion Test Procedure. The results are summarized in Table 6.

TABLE 6

Release and Readhesion results for dry laminated ADH-1 adhesive and a blend of the FOPS-7786 fluoroorganopolysiloxane polymer and the NFPOS-4 non-fluorinated organosiloxane polymer.

| Blend | NF:F ratio | Release (g/25 mm) 5 d-CT | Release (g/25 mm) 5 d-HT | Readhesion (g/25 mm) 5 d-CT | Readhesion (g/25 mm) 5 d-HT |
|---|---|---|---|---|---|
| CE-E1 | 0:100 | 30.7 | 18.5 | 1760 | 1870 |
| EX-E1 | 50:50 | 18.8 | 17.3 | 1550 | 1520 |
| EX-E2 | 80:20 | 17.0 | 15.3 | 1520 | 1570 |

DATA SET F. Various non-fluorinated organopolysiloxanes were blended with the FOPS-7786 fluoroorganopolysiloxane material. NFPOS-3 was used for Examples EX-F1 and -F2; NFPOS-5 was used for Examples EX-F3 and -F4; and NFPOS-6 was used for Examples EX-F5 and -F6. The blended release compositions were coated onto Mitsubishi 2.0 mil 3SAC primed PET film using a #6 Mayer bar, and cured at 120° C. for 5 minutes. ADH-1 was dry laminated on the cured release coatings per the Sample Preparation Procedure. These constructions were conditioned for seven days at 22° C. (7d-CT), seven days at 70° C. (7d-HT), or thirty days at 22° C. (30d-CT). The conditioned samples were evaluated using the Release Test Procedure and the Readhesion Test Procedure.

TABLE 7

Release and Readhesion results for dry laminated ADH-1 adhesive and a blend of the FOPS-7786 fluoroorganopolysiloxane polymer and various non-fluorinated organosiloxane polymers.

| Blend | NF:F ratio | Release (g/25 mm) | | | Readhesion (g/25 mm) | | |
|---|---|---|---|---|---|---|---|
| | | 7d-CT | 7d-HT | 30d-CT | 7d-CT | 7d-HT | 30d-CT |
| CE-F1 | 0:100 | 11.1 | 10.5 | 6.6 | 1380 | 1360 | 1290 |
| EX-F1 | 50:50 | 7.5 | 6.3 | 5.9 | 1400 | 1420 | 1370 |
| EX-F2 | 80:20 | 41.2 | 29.5 | 13.3 | 140 | 1390 | 1330 |
| EX-F3 | 50:50 | 6.7 | 10.5 | 9.1 | 1500 | 1480 | 1390 |
| EX-F4 | 80:20 | 15.5 | 19.9 | 12.5 | 1500 | 1580 | 1510 |
| EX-F5 | 50:50 | 10.1 | 14.1 | 13.7 | 1510 | 1490 | 1410 |
| EX-F5 | 80:20 | 42.7 | 32.1 | 25.3 | 1420 | 1570 | 1530 |

DATA SET G. Various non-fluorinated organopolysiloxanes were blended at a weight ratio of 1:2 with 7560 hydride pendent functional fluorinated crosslinker as a 10 wt. % solution in 4:1 ethyl acetate and heptane solvent system. This blend was then combined with FOPS-7785. The resulting composition was coated onto Mitsubishi 2.0 mil 3SAC primed PET film using a #6 Mayer bar, and cured at 120° C. for 5 minutes. ADH-1 was dry laminated and wet cast on the cured release coatings per the Sample Preparation Procedure. These constructions were conditioned for six days at 22° C. (6d-CT) or six days at 70° C. (6d-HT). The samples were evaluated using the Release Test Procedure and the Readhesion Test Procedure. The results of the dry laminated samples are summarized in Table 8A. The results of the wet cast samples are summarized in Table 8B.

TABLE 8A

Release and Readhesion results for dry laminated ADH-1 adhesive.

| Blend | Non-fluorinated polymer (a) | Fluorinated polymer (b) | NF:F ratio | Release (g/25 mm) | | Readhesion (g/25 mm) | |
|---|---|---|---|---|---|---|---|
| | | | | 6d-CT | 6d-HT | 6d-CT | 6d-HT |
| EX-G1 | VSM-T11 | FOPS-7785 | 20:80 | 6.7 | 13.0 | 1430 | 1490 |
| EX-G2 | VSM-T11 | FOPS-7785 | 10:90 | 9.4 | 17.1 | 1440 | 1480 |
| EX-G3 | TMTVTSI | FOPS-7785 | 50:50 | 7.9 | 8.1 | 1520 | 1500 |
| EX-G4 | TMTVTSI | FOPS-7785 | 20:80 | 6.3 | 7.9 | 1510 | 1510 |
| EX-G5 | TMTVTSI | FOPS-7785 | 10:90 | 9.5 | 16.9 | 1520 | 1390 |

(a) 10 wt. % solution of a 1:2 blend by weight with 7560 in 4:1 ethyl acetate:heptane.
(b) 10 wt. % solution of a 97:3 blend by weight with 7560 in 4:1 ethyl acetate:heptane.

TABLE 8B

Release and Readhesion results for wet cast ADH-1 adhesive.

| Blend | Non-fluorinated polymer (a) | Fluorinated polymer (b) | NF:F ratio | Release (g/25 mm) | | Readhesion (g/25 mm) | |
|---|---|---|---|---|---|---|---|
| | | | | 6d-CT | 6d-HT | 6d-CT | 6d-HT |
| EX-G1 | VSM-T11 | FOPS-7785 | 20:80 | 9.1 | 16.9 | 1870 | 2020 |
| EX-G2 | VSM-T11 | FOPS-7785 | 10:90 | 10.1 | 20.7 | 1680 | 1920 |
| EX-G3 | TMTVTSI | FOPS-7785 | 50:50 | 8.6 | 10.3 | 1810 | 2050 |
| EX-G4 | TMTVTSI | FOPS-7785 | 20:80 | 8.7 | 12.7 | 1770 | 2070 |
| EX-G5 | TMTVTSI | FOPS-7785 | 10:90 | 10.3 | 19.5 | 1730 | 1910 |

(a) 10 wt. % solution of a 1:2 blend by weight with 7560 in 4:1 ethyl acetate:heptane.
(b) 10 wt. % solution of a 97:3 blend by weight with 7560 in 4:1 ethyl acetate:heptane.

DATA SET H. A blend of 97 wt. % DOW 7850 hexenyl end and terminal functional non-fluorinated PDMS and 3 wt. % DOW 7488 hydride pendent functional non-fluorinated crosslinker and was combined with FOPS-7785, as summarized in Table 9A. The compositions summarized in Table 9A were coated onto Mitsubishi 2.0 mil 3SAC primed PET film using a #6 Mayer bar, and cured at 120° C. for 10 minutes.

TABLE 9A

Description of the organopolysiloxane blends.

| Blend | Non-fluorinated polymer | Fluorinated polymer (b) | NF:F ratio |
|---|---|---|---|
| CE-H1 | none | FOPS-7785 | 0 |
| EX-H1 | 7850 (a) | FOPS-7785 | 75:25 |
| EX-H2 | 7850 (a) | FOPS-7785 | 50:50 |

(a) blend of a functional non-fluorinated PDMS and a non-fluorinated crosslinker
(b) blend of a functional fluorosilicone and a fluorinated crosslinker ADH-1 was dry laminated and wet cast on the cured release coatings per the Sample Preparation Procedure. These constructions were conditioned for seven days at 22° C. (7d-CT) or seven days at 70° C. (7d-HT). The samples were evaluated using the Release Test Procedure and the Readhesion Test Procedure. The results of the dry laminated samples are summarized in Table 9B. The results of the wet cast samples are summarized in Table 9C.

TABLE 9B

Release and readhesion results for dry laminated ADH-1.

| Blend | Release (g/25 mm) | | Readhesion (g/25 mm) | |
|---|---|---|---|---|
| | 7 d-CT | 7 d-HT | 7 d-CT | 7 d-HT |
| CE-H1 | 10.7 | 14.3 | 2120 | 2140 |
| EX-H1 | 13.5 | 26.8 | 2070 | 2100 |
| EX-H2 | 18.9 | 63.7 | 2110 | 2120 |

TABLE 9C

Release and readhesion results for wet cast ADH-1.

| Blend | Release (g/25 mm) | | Readhesion (g/25 mm) | |
|---|---|---|---|---|
| | 7 d-CT | 7 d-HT | 7 d-CT | 7 d-HT |
| CE-H1 | 11.0 | 26.2 | 1730 | 2140 |
| EX-H1 | 20.5 | 47.6 | 2060 | 2270 |
| EX-H2 | 41.8 | 129.6 | 1900 | 2180 |

ADH-2 was dry laminated and wet cast on the cured release coatings per the Sample Preparation Procedure. These constructions were conditioned for seven days at 22° C. (7d-CT) or seven days at 70° C. (7d-HT). The samples were evaluated using the Release Test Procedure and the Readhesion Test Procedure. The results of the dry laminated samples are summarized in Table 9D. The results of the wet cast samples are summarized in Table 9E.

TABLE 9D

Release and readhesion results for dry laminated ADH-2.

| | Release (g/25 mm) | | Readhesion (g/25 mm) | |
|---|---|---|---|---|
| Blend | 7 d-CT | 7 d-HT | 7 d-CT | 7 d-HT |
| CE-H1 | 6.1 | 8.3 | 1960 | 1580 |
| EX-H1 | 13.0 | 22.4 | 1840 | 1720 |
| EX-H2 | 15.9 | 30.8 | 1990 | 1760 |

TABLE 9E

Release and readhesion results for wet cast ADH-2.

| | Release (g/25 mm) | | Readhesion (g/25 mm) | |
|---|---|---|---|---|
| Blend | 7 d-CT | 7 d-HT | 7 d-CT | 7 d-HT |
| CE-H1 | 6.1 | 9.4 | 1783 | 1441 |
| EX-H1 | 12.6 | 22.2 | 1902 | 1368 |
| EX-H2 | 21.4 | 54.9 | 2119 | 1572 |

DATA SET J. A blend of 97 wt. % DOW 7850 hexenyl end and terminal functional non-fluorinated PDMS and 3 wt. % DOW 7488 hydride pendent functional non-fluorinated crosslinker and was combined with FOPS-7786 except that the FOPS solution was prepared at 15 wt. %, 20 wt. % and 25 wt. % solids rather than 10 wt. % solids. The compositions are summarized in Table 10.

The blend was coated onto Mitsubishi 2.0 mil 3SAC primed PET film using a #12 Mayer bar and cured at 120° C. for 5 minutes. Relative to each other, use of the 15 wt. % solution resulted in a low dry coat weight, use of the 20 wt. % solids resulted in a medium dry coat weight, and use of the 25 wt. % solids resulted in a high dry coat weight. ADH-1 was dry laminated on the cured release coatings per the Sample Preparation Procedure. These constructions were conditioned for five days at 22° C. (5d-CT) or five days at 70° C. (5d-HT). The conditioned samples were evaluated using the Release Test Procedure and the Readhesion Test Procedure. The results of the dry laminated samples are summarized in Table 10.

TABLE 10

Release and Readhesion results for dry laminated ADH-1 adhesive and a blend of a fluoroorganopolysiloxane polymer and a non-fluorinated organosiloxane.

| | | | Relative | Release (g/25 mm) | | Readhesion (g/25 mm) | |
|---|---|---|---|---|---|---|---|
| Blend | NF:F ratio | Wt. % solids | coat weight | 5d-CT | 5d-HT | 5d-CT | 5d-HT |
| CE-J1 | 99:1 | 15 | low | 170 | 1110 | 1510 | 1420 |
| CE-J2 | 99:1 | 20 | medium | 3.9 | 110 | 1270 | 1980 |
| CE-J3 | 99:1 | 25 | high | 710 | 1250 | 1350 | 1170 |
| EX-J1 | 95:5 | 15 | low | 6.9 | 7.2 | 1840 | 2040 |
| EX-J2 | 95:5 | 20 | medium | 2.6 | 4.8 | 1860 | 2000 |
| EX-J3 | 95:5 | 25 | high | 3.2 | 8.2 | 1810 | 1950 |
| EX-J4 | 80:20 | 15 | low | 2.7 | 4.5 | 1860 | 1940 |
| EX-J5 | 80:20 | 20 | medium | 3.9 | 6.9 | 1760 | 1880 |
| EX-J6 | 80:20 | 25 | high | 3.7 | 5.7 | 1830 | 1970 |

DATA SET K. A blend of 97 wt. % DOW 7850 hexenyl end and terminal functional non-fluorinated PDMS and 3 wt. % DOW 7488 hydride pendent functional non-fluorinated crosslinker and was combined with FOPS-7786, except that the FOPS solution was prepared at 25 wt. % solids. The blend was coated at 25 wt. % solids onto Mitsubishi 2.0 mil 3SAC primed PET film using a #12 Mayer bar and cured at 120° C. for 5 minutes. The compositions are summarized in Table 11.

An acrylic adhesive (ADH-3) was roll coated on the cured release coatings, dried and cured to provide a 50 micron (2 mil) dry adhesive layer. These constructions were conditioned for five days at 70° C. (5d-HT). The conditioned samples were evaluated using the Release Test Procedure and the Readhesion Test Procedure. The results of these wet cast samples are summarized in Table 11.

TABLE 11

Release and Readhesion results for a wet cast acrylic adhesive (ADH-3) on a blend of a fluoroorganopolysiloxane and a non-fluorinated organosiloxane polymer.

| | NF:F | 5 d-HT (g/25 mm) | |
|---|---|---|---|
| Blend | ratio | Release | Readhesion |
| EX-K1 | 99:1 | 23.8 | 1290 |
| EX-K2 | 95:5 | 18.0 | 1310 |
| EX-K3 | 80:20 | 17.2 | 1170 |

DATA SET L. Non-fluorinated organopolysiloxane solution NFPOS-7 was prepared as follows. DMS-V46 vinyl functional silicone (25 grams) was dissolved a solvent system consisting of 20 grams of ethyl acetate and 5 grams of heptane. An inhibitor (0.06 grams of diallyl maleate (MOMENTIVE SL6040)) and 3.75 grams of a platinum catalyst (MOMENTIVE 6210-1P) were added to produce an intermediate solution. NFPOS-7 was prepared by combining 5 grams of this intermediate solution with 0.07 grams of a silane functional crosslinker (DOW 7488, 82 g/eq SiH) in a 40 grams of a 4:1 ethyl acetate:heptane solvent system.

NFPOS-8 was prepared in the same manner except that DMS-V51 vinyl functional silicone was used and only 0.06 grams of the silane functional crosslinker (DOW 7488, 82 g/eq SiH) were added.

Blends of NFPOS-7 and NFPOS-8 non-fluorinated silicone solutions were blended with FOPS-7786 fluorosilicone solution as summarized in Table 12. The blends were coated onto Mitsubishi 2.0 mil 3SAC primed PET film using a #3 Mayer bar and cured at 120° C. for 5 minutes. ADH-1 was dry laminated on the cured release coatings per the Sample Preparation Procedure. These constructions were conditioned for seven days at 22° C. (7d-CT), seven days at 70° C. (7d-HT), or thirty days at 22° C. (30d-CT). The conditioned samples were evaluated using the Release Test Procedure and the Readhesion Test Procedure. The results are summarized in Table 12.

TABLE 12

Compositions and test results for dry laminated ADH-1 adhesive.

| | Non-fluorinated polymer | Fluorinated polymer | NF:F ratio | Release (g/25 mm) | | Readhesion (g/25 mm) | |
|---|---|---|---|---|---|---|---|
| Blend | | | | 7d-CT | 7d-HT | 7d-CT | 7d-HT |
| EX-L1 | NFPOS-7 | FOPS-7786 | 50:50 | 37.8 | 68.3 | 1610 | 1540 |
| EX-L2 | NFPOS-7 | FOPS-7786 | 80:20 | 16.4 | 23.3 | 1610 | 1800 |

TABLE 12-continued

Compositions and test results for dry laminated ADH-1 adhesive.

| Blend | Non-fluorinated polymer | Fluorinated polymer | NF:F ratio | Release (g/25 mm) 7d-CT | Release (g/25 mm) 7d-HT | Readhesion (g/25 mm) 7d-CT | Readhesion (g/25 mm) 7d-HT |
|---|---|---|---|---|---|---|---|
| EX-L3 | NFPOS-8 | FOPS-7786 | 50:50 | 9.2 | 21.5 | 1670 | 1740 |
| EX-L4 | NFPOS-8 | FOPS-7786 | 80:20 | 151 | 206 | 1560 | 1700 |

DATA SET M. Various non-fluorinated, vinyl functional organopolysilioxanes (DMS-V21 and DMS-V41) were combined with FOPS-CF3 fluorinated polysiloxane in heptane to prepare 10 wt. % solids solutions.

The solutions were coated onto Mitsubishi 2.0 mil 3SAC primed PET film using a #10 Mayer bar and cured at 120° C. for 5 minutes. ADH-1 was dry laminated on the cured release coatings per the Sample Preparation Procedure. These constructions were conditioned for seven days at 22° C. (7d-CT), seven days at 70° C. (7d-HT), or thirty days at 22° C. (30d-CT). The conditioned samples were evaluated using the Release Test Procedure and the Readhesion Test Procedure. The compositions and results are summarized in Table 13.

TABLE 13

Compositions and test results for dry laminated ADH-1 adhesive.

| Blend | Non-fluorinated polymer | Fluorinated polymer | NF:F ratio | Release (g/25 mm) 7d-CT | Release (g/25 mm) 7d-HT | Readhesion (g/25 mm) 7d-CT | Readhesion (g/25 mm) 7d-HT |
|---|---|---|---|---|---|---|---|
| CE-M1 | — | FOPS-CF3 | 0:100 | 7.4 | 9.6 | 1540 | 1780 |
| EX-M1 | NFOPS-2 | FOPS-CF3 | 50:50 | 52.2 | 124 | 1610 | 1690 |
| EX-M2 | NFOPS-2 | FOPS-CF3 | 80:20 | 76.2 | 298 | 1660 | 1730 |
| EX-M3 | NFOPS-6 | FOPS-CF3 | 50:50 | 110 | 164 | 1460 | 1590 |
| EX-M4 | NFOPS-6 | FOPS-CF3 | 80:20 | 1940 | 2210 | 690 | 870 |

As demonstrated by the examples above and as illustrated in FIG. 1, the release compositions of the present disclosure may be used as the release layer of a release liner. Referring to FIG. 1, release liner 10 comprises substrate 20 and release layer 30, bonded to first major surface 21 of substrate 20. In some embodiments, the release layer is directly bonded to the substrate. In some embodiments, the release layer may be indirectly bonded to the substrate, e.g., one or more intervening layers (e.g., primer layers) may be interposed between the release layer and the substrate. Generally, any substrate may be used including, e.g., paper, glassine, polymeric films, polycoated papers, and the like.

Figure 2:
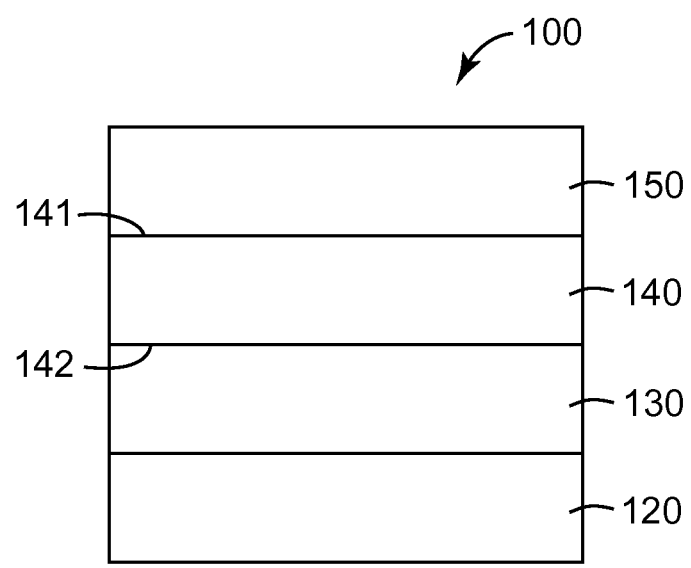
FIG. 2 illustrates an exemplary adhesive article according to some embodiments of the present disclosure.

The release compositions of the present disclosure may also be suitable for use in a wide variety of adhesive articles. For example, in some embodiments, a supported or unsupported adhesive layer may be bonded to the release layer. The release layer may be bonded to a substrate (i.e., the release composition may be the release layer on a release liner). In some embodiments, the adhesive may be bonded, directly or indirectly, to a backing For example, referring to FIG. 2, exemplary adhesive article 100 according to some embodiments of the present disclosure comprises backing 150. Generally, any known backing may be used including those comprising one or more layers of paper, polymer films, metallic foils, foam, and the like. First major surface 141 of adhesive 140 is bonded to backing 150. Opposite second major surface 142 or adhesive 140 is bonded to release layer 130, which itself is bonded to substrate 120. In the foregoing description, a layer may be bonded directly or indirectly to its adjacent layer(s).

In some embodiments, the adhesive article may not include a release liner. For example, in some embodiments, the release material may be bonded to one major surface of a backing with the adhesive bonded to the opposite major surface. The adhesive may then be self-wound or stacked such that the adhesive of one layer contacts the release material of the underlying layer.

Generally, the adhesive is not particularly limited. Common adhesives, including pressure sensitive adhesives, include acrylates, rubbers, block copolymers, and silicones. In some embodiments, the adhesive articles comprise a silicone adhesive.

Various modifications and alterations of this invention will become apparent to those skilled in the art without departing from the scope and spirit of this invention.

What is claimed is:
1. An adhesive article comprising
(I) a release liner comprising a substrate and a cured release composition derived from a coatable release solution comprising a solvent system comprising a polar solvent and a non-polar solvent and a curable release composition dissolved in the solvent system, wherein the coatable release solution is coated on at least one surface of the substrate, and further wherein the release composition comprises
(a) an ethylenically unsaturated non-fluorinated organopolysiloxane base polymer having a vinyl equivalent weight of 400 to 25,000 grams per equivalent and a weight average molecular weight of 800 to 50,000 grams per mole, wherein the non-fluorinated organopolysiloxane polymer comprises $R_2SiO_{2/2}$ units wherein each R group independently represents a saturated or ethylenically unsaturated, substituted or unsubstituted hydrocarbon radical, provided that at least two R groups contain terminal ethylenic unsaturation;
(b) an ethylenically unsaturated fluoroorganopolysiloxane polymer having a structure selected from at least one of:
  (i) $M^{Vi}D_9{}^{Rf1}D_{51}M^{Vi}$,
  (ii) $M^{Vi}D_6{}^{Vi}D_{300}{}^{Rf2}D_{600}M^{Vi}$,
  (iii) $M^{Vi}D_{30}{}^{Rf2}D_{30}M^{Vi}$,
  wherein Rf1=—$CH_2CH_2CF_3$, and Rf2=—$CH_2CH_2CF_2CF_2CF_2CF_3$;
(c) a hydrosilation catalyst; and
(d) at least one crosslinker selected from the group consisting of
  (i) an fluoroorganohydrogenpolysiloxane and
  (ii) an organohydrogenpolysiloxane; and
(II) a pressure-sensitive adhesive in contact with the release composition.

2. The adhesive article according to claim 1, wherein the non-fluorinated organopolysiloxane polymer has a vinyl equivalent weight of 2000 to 5000 grams per equivalent.

3. The adhesive article according to claim 1, wherein the ethylenically unsaturated fluoroorganopolysiloxane polymer comprises an average of at least two ethylenically unsaturated organic groups.

4. The adhesive article according to claim 1, wherein fluoroorganopolysiloxane polymer comprises a siloxane backbone and pendant C1 to C6 perfluoroalkyl groups bonded to backbone with a linking group.

5. The adhesive article according to claim 4, wherein the linking group is an alkylene group comprising at least two carbon atoms.

6. The adhesive article according to claim 4, wherein the pendant perfluoroalkyl group is —$C_4F_9$.

7. The adhesive article according to claim 1, wherein the weight ratio of non-fluorinated organopolysiloxane to fluoroorganopolysiloxane is between 50:50 and 95:5, inclusive.

8. The adhesive article according to claim 7, wherein the weight ratio of non-fluorinated organopolysiloxane to fluoroorganopolysiloxane is between 75:25 and 90:10, inclusive.

9. The adhesive article according to claim 1, wherein the solvent system comprises at least 50 percent by weight of the polar solvent.

10. The adhesive article according to claim 1, wherein the curable release composition comprises both the fluoroorganohydrogenpolysiloxane crosslinker and the organohydrogenpolysiloxane crosslinker.

11. The adhesive article of claim 1, further comprising a backing adhered to the adhesive opposite the release liner.

12. The adhesive article according to claim 1, wherein the adhesive comprises a silicone adhesive.

13. The adhesive article according to claim 1, wherein the adhesive comprises an acrylate adhesive.

14. The adhesive article of claim 9, wherein the polar solvent is selected from at least one of an ester, an aromatic solvent, an ether, a ketone, and combination thereof.

15. The adhesive article of claim 9, wherein the polar solvent is selected from at least one of ethyl acetate, toluene, trifluoroemthyl toluene, diethyl ether, methyl perfluorobutyl ether, ethyl perfluorobutyl ether, t-butyl ether, methyl ether, tetrahydrofuran, acetone, methyl ethyl ketone, methyl isobutyl ketone, and combinations thereof.

16. The adhesive article of claim 9, wherein the non-polar solvent comprises aliphatic hydrocarbon solvents.

17. The adhesive article of claim 9, wherein the non-polar solvent comprises at least one of heptane, hexane, cyclohexane, and combinations thereof.

\* \* \* \* \*

UNITED STATES PATENT AND TRADEMARK OFFICE
CERTIFICATE OF CORRECTION

PATENT NO. : 9,206,317 B2  
APPLICATION NO. : 13/504545  
DATED : December 8, 2015  
INVENTOR(S) : Jayshree Seth et al.

Page 1 of 2

It is certified that error appears in the above-identified patent and that said Letters Patent is hereby corrected as shown below:

On the title page

Item 56, Col. 2 (Other Publications)
Line 2, delete "Illife Books" and insert -- Iliffe Books --

Line 5, delete ""Principes" and insert -- "Principles --

In the specification

Column 2
Line 26, delete "adhesive" and insert -- adhesive. --

Column 3
Line 47, delete "group" and insert -- group. --

Column 5
Line 54, delete "DH" and insert -- $D^H$ --

Column 6
Line 2, delete "O)$_m$SiMe$_2$-H," and insert -- O)$_m$—SiMe$_2$-H, --

Line 4, delete "O)$_m$SiEt$_2$-H;" and insert -- O)$_m$—SiEt$_2$-H; --

Line 10, delete "(SiMe$_2$-O)$_p$" and insert -- —(SiMe$_2$-O)$_p$ --

Line 14, delete "(SiMePh-O)O" and insert -- (SiMePh-O)$_o$ --

Line 16, delete "(SiMePh-O)O" and insert -- (SiMePh-O)$_o$ --

Signed and Sealed this  
Twenty-eighth Day of June, 2016

Michelle K. Lee  
*Director of the United States Patent and Trademark Office*

CERTIFICATE OF CORRECTION (continued)
U.S. Pat. No. 9,206,317 B2

Column 6
Line 25, delete "—O)$_n$" and insert -- —O)$_m$— --

Line 27, delete "—O)$_n$" and insert -- —O)$_m$— --

Line 58, delete "trifluoroemthyl" and insert -- trifluoromethyl --

Column 7
Line 30, delete "50,000-gm/mole," and insert -- 50,000 gm/mole, --

Column 11
Line 1, delete "organopolysilioxane" and insert -- organopolysiloxane --

Line 21, Table 1E, delete "organopolysilioxane" and insert -- organopolysiloxane --

Line 31, delete "Organopolysilioxane" and insert -- Organopolysiloxane --

Column 15
Line 34, delete "minutes." and insert -- 5 minutes. --

Column 20
Line 29, delete "organopolysilioxane" and insert -- organopolysiloxane --

Column 21
Line 13, delete "organopolysilioxane" and insert -- organopolysiloxane --

Line 60, delete "backing" and insert -- backing. --

In the claims

Column 24
Line 10, in claim 15, delete "trifluoroemthyl" and insert -- trifluoromethyl --